(12) United States Patent
Diachok

(10) Patent No.: US 6,510,107 B2
(45) Date of Patent: Jan. 21, 2003

(54) ACOUSTIC METHOD AND SYSTEM FOR MEASURING FISH POPULATION DATA IN LITTORAL ENVIRONMENTS

(75) Inventor: Orest Diachok, Oakton, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/804,644

(22) Filed: Mar. 9, 2001

(65) Prior Publication Data
US 2002/0015358 A1 Feb. 7, 2002

Related U.S. Application Data
(60) Provisional application No. 60/194,403, filed on Apr. 4, 2000.

(51) Int. Cl.[7] .............................................. H04B 11/00
(52) U.S. Cl. ...................................................... 367/131
(58) Field of Search ................ 367/3, 4, 131; 441/2, 21, 23, 24, 25, 26

(56) References Cited

U.S. PATENT DOCUMENTS

| | | | |
|---|---|---|---|
| 3,372,368 A | | 3/1968 | Dale et al. |
| 3,982,222 A | | 9/1976 | Urick |
| 4,225,951 A | | 9/1980 | Menin et al. |
| 4,262,379 A | * | 4/1981 | Jankiewicz |
| 4,290,125 A | | 9/1981 | Honda |
| 4,439,844 A | | 3/1984 | Menin |
| 4,446,542 A | * | 5/1984 | Beckerle ..................... 367/131 |
| 5,224,074 A | * | 6/1993 | Sullivan ......................... 367/4 |
| 5,418,757 A | * | 5/1995 | Rau et al. ....................... 367/4 |
| 5,654,939 A | | 8/1997 | Bruengger et al. |
| 5,663,927 A | | 9/1997 | Olson et al. |

\* cited by examiner

*Primary Examiner*—Daniel T. Pihulic
(74) *Attorney, Agent, or Firm*—John J. Karasek; L. George Legg

(57) ABSTRACT

A method and system are provided for obtaining acoustic data for use in determining fish populations in shallow waters. The system includes an acoustic source comprising a buoyancy unit, anchor, and a broadband acoustic transmitter, and a cable which connects the buoyancy unit to the anchor and supports the transmitter. The system also includes one or more acoustic receivers employing hydrophones and including a similar buoyancy unit, anchor, and cable. When the source and receiver are (separately) deployed, the respective cables are released so that the buoyancy units rise in the water. Thus, with the source and receiver anchored to the bottom the transmitter and hydrophones are suspended at a depth near the bottom (below the thermocline if there is a thermocline) determined by the cable length released. At this time, acoustic signals are transmitted from the acoustic transmitter to the hydrophones for recording. Next, the cables are again released so that the buoyancy units rise higher in the water and thus the transmitter and hydrophones are suspended at greater heights from the bottom, i.e., near the surface (above the thermocline if there is a thermocline). When this is done, acoustic signals are again transmitted from the acoustic transmitter to the hydrophones for recording. The source and receivers are ultimately released from the respective anchors for recovery.

15 Claims, 3 Drawing Sheets

ACOUSTIC METHOD AND SYSTEM FOR MEASURING FISH POPULATION DATA IN LITTORAL ENVIRONMENTS

The present application claims priority to provisional patent application No. 60/194,403, filed Apr. 4, 2000.

FIELD OF THE INVENTION

The present invention relates to a method and system for monitoring fish population data, such as the average length, depth and number density of fish with swim bladders in littoral seas. More particularly, the present invention relates to a fixed-source/fixed-receiver system that measures transmission loss over a large band of frequencies in such littoral environments.

BACKGROUND OF THE INVENTION

Historically, the number of densities of fish have been measured with ship mounted sonar source-receiver systems that typically operated at 38 kHz. At these frequencies sonar source-receiver systems are not sensitive to fish length. To determine distributions of fish length and type, fish have to be sampled using nets, which are towed from ships. Fusing of the two types of data permits estimation of the number density versus fish length and type. These kinds of measurements are plagued by uncertainties, including those which are caused by ship avoidance behavior exhibited by fish, and by other effects. These effects are so complex that quantitative analysis of the uncertainties in the resultant estimates of number densities is extremely difficult. As a result, in general, quantitative measurements are not taken. The cost of such measurements is expensive, as it is driven by the cost of ship time at sea.

Consequently, measurement of the temporal evolution of number densities is generally not practical. Furthermore, such measurements are not synoptic. During the course of a measurement, which may require several days to complete, the spatial concentrations of fish may change; consequently, such measurements do not provide useful information about spatial distributions.

Transmission loss measurements made over a long duration over large frequency bands between fixed sources and receivers provide information about the size and number density of pelagic fish in littoral environments. The frequency of absorption lines is related to the size of swim bladders and the depth of absorbing layers, and the magnitude of the absorption coefficient is related to the number density (commonly referred to as biomass by fisheries scientists).

Absorption coefficients associated with layers of fish may be derived from transmission loss measurements over a wide band of frequencies by comparing measurements with computations of transmission loss with theoretical models of sound propagati on that include absorption layers that represent layers of fish. These models require knowledge of the sound speed profile between the source and the receiver, the depth of the bottom and the physical properties of the bottom. Sound speed profiles can be derived from detailed temperature versus depth measurements, and limited salinity versus depth measurements at the source and receiver. The bottom depth can be measured with an echo sounder. The physical properties of the bottom can be derived collection and storage system. U.S. Pat. No. 3,982,222 (Urick) discloses a string of hydrophone units attached to a cable held in a substantially vertical position by a floating buoy and an anchor. U.S. Pat. No. 3,372,368 (Dale) discloses a string of hydrophone units maintained in a vertical line array by a truss arrangement. The vertical line array is held in a substantially vertical position by a free floating surface station.

In another prior art approach for monitoring fish population data, a series of hydrophones have been cabled to the shore. While this approach serves its intended purpose, it is prohibitively expensive and is site specific.

SUMMARY OF THE INVENTION

In accordance with the invention, an improved acoustic measurement method and system are provided for determining fish population densities and other data regarding fish and like aquatic creatures. The invention is substantially less expensive to make and use than prior systems such as those employing hydrophones cabled to shore and provides additional advantages as well. One important aspect of the invention is the use of a continuous wave (CW) source to generate CW signals over a range of frequencies providing a high signal-to-noise ratio when detecting fish. A further important feature concerns the ability to readily and effectively deploy and retrieve the sources and receivers. Another key feature of the invention is that the receiver-source system is autonomous and requires no additional monitoring once the system is deployed. Because of these features, the invention can be of particular value to commercial fishermen, who have legal restrictions with respect to the different species of fish that they catch, as well as to commercial manufacturers of sonar equipment, who can use the invention to calibrate the effectiveness of their equipment in different littoral environments.

In accordance with one aspect of the invention, a method is provided for determining data with respect to fish populations in shallow water environments, the method comprising: deploying at least one acoustic source unit and at least one acoustic receiver unit at first depths preferably near the bottom and below the thermocline (if a thermocline is present) and using the at least one receiver unit to receive and record first acoustical transmissions from the at least one source unit at these first depths; and deploying the at least one source unit and the at least one receiver unit at second, higher depths preferably near the surface and above the thermocline (if a thermocline is present) and using the at least one receiver unit to receive and record second acoustical transmissions from the at least one source unit at these second depths.

Preferably, each of the at least one source unit and the at least one receiver unit is, when fully deployed, anchored by an anchor to the bottom and is supported on a respective cable connected to a buoyancy unit and to the anchor, and each of the at least one source unit and the at least one receiver unit is positioned at the first depths by releasing the cable so that a first predetermined length of the cable is payed out as the buoyancy unit rise in the water. Similarly, the units are positioned at the second depths by releasing the cable so that a second, longer predetermined length of the cable is payed out.

Advantageously, each of the units is released from its respective anchor after receiving and recording of the first and second transmissions is completed so that the units can rise to the water surface for recovery.

In an important implementation, the at least one acoustic source transmits for twelve hours near the bottom (below the thermocline) and for twelve hours near the surface (above the thermocline) so as to better track the movement of the fish over a full day.

In accordance with a further aspect of the invention, a method is provided for obtaining acoustic data for use in determining fish population in shallow waters, the method comprising the steps of: deploying, in a shallow water site having a bottom, an acoustic source comprising a first buoyancy unit, a first anchor, at least one acoustic transmitter, and a first cable connecting said first buoyancy unit to the first anchor and supporting the transmitter; deploying at least one acoustic receiver comprising a second buoyancy unit, at least one hydrophone, a second anchor, and a second cable connecting the second buoyancy unit to the second anchor and supporting the at least one hydrophone; separately releasing said first and second cables so that said first and second buoyancy units rise in the water so that, with the source and receiver anchored to the bottom by the respective first and second anchors, said transmitter and the acoustic transmitter preferably comprises continuous wave broadband transmitter. Advantageously, the broadband transmitter transmits at frequencies between 0.2 and 10 kHz. In a beneficial implementation, the transmitter transmits an acoustic signal having an intensity level of at least 160 dB (preferably 170 dB).

Preferably, the source further comprises a control unit supported on said cable for supplying power to the transmitter and for controlling the operation of the transmitter.

The control unit advantageously includes a computer programmed to control start and stop times of transmissions by the transmitter.

The deployable source preferably includes a depth sensor mounted on the cable.

In accordance with a further aspect of the invention, a deployable receiver is provided for use in determining the fish population in a water environment at which the receiver is deployed, the receiver comprising: a buoyancy unit; at least one acoustic hydrophone means for receiving and recording acoustic signals for use in measuring fish population data; an anchor; a deployable cable, connected at one end to the buoyancy unit and at the opposite end to the anchor, for supporting the hydrophone at an intermediate point along the length of the cable such that when the cable is deployed, the buoyancy unit rises and the hydrophone is suspended by the cable between the buoyancy unit and the anchor, and an anchor release means for releasably connecting the cable to the anchor.

Advantageously, the anchor release means of the receiver (and of the source) comprises both an acoustic release unit and a timed release unit.

Preferably, the at least one hydrophone means includes four serially arranged hydrophones. The at least one hydrophone means comprises at least one and preferably four hydrophones for receiving the acoustic signals, signal conditioning means for conditioning these signals, an analog-to-digital converter for converting the signals into digital signals, a computer for processing the digital signals and a memory for storing the digital signals.

As with the source, the receiver preferably further comprises a depth sensor supported on said cable.

Further features and advantages of the present invention will be set forth in, or apparent from, the detailed description of preferred embodiments thereof which follows.

DESCRIPTION OF THE PREFERRED EMBODIMENT

Figure 1:
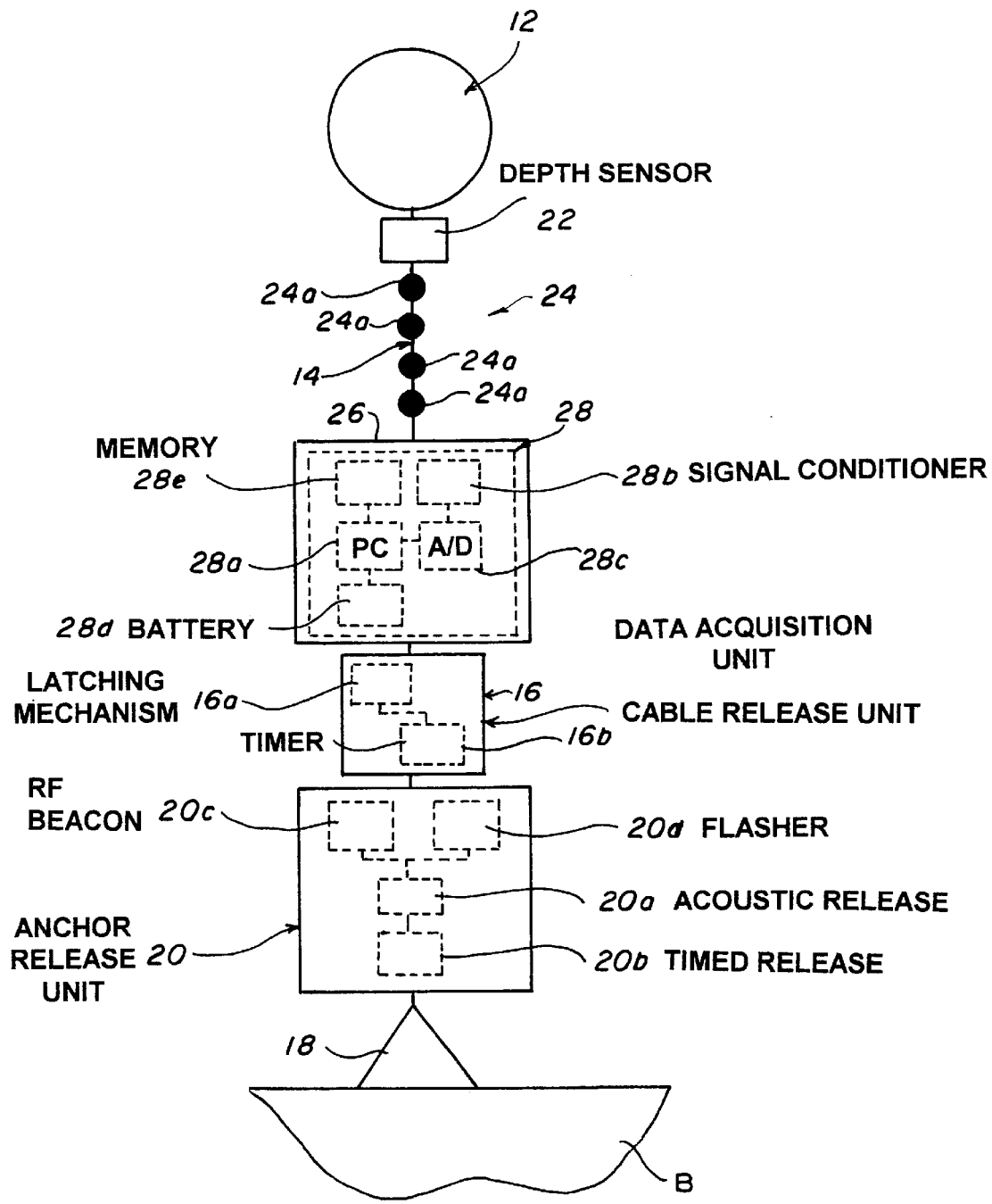
FIG. 1 is a schematic diagram of a preferred embodiment of a deployable receiver of an acoustic measurement system for measuring the average length, depth and number density of fish.
Figure 2:
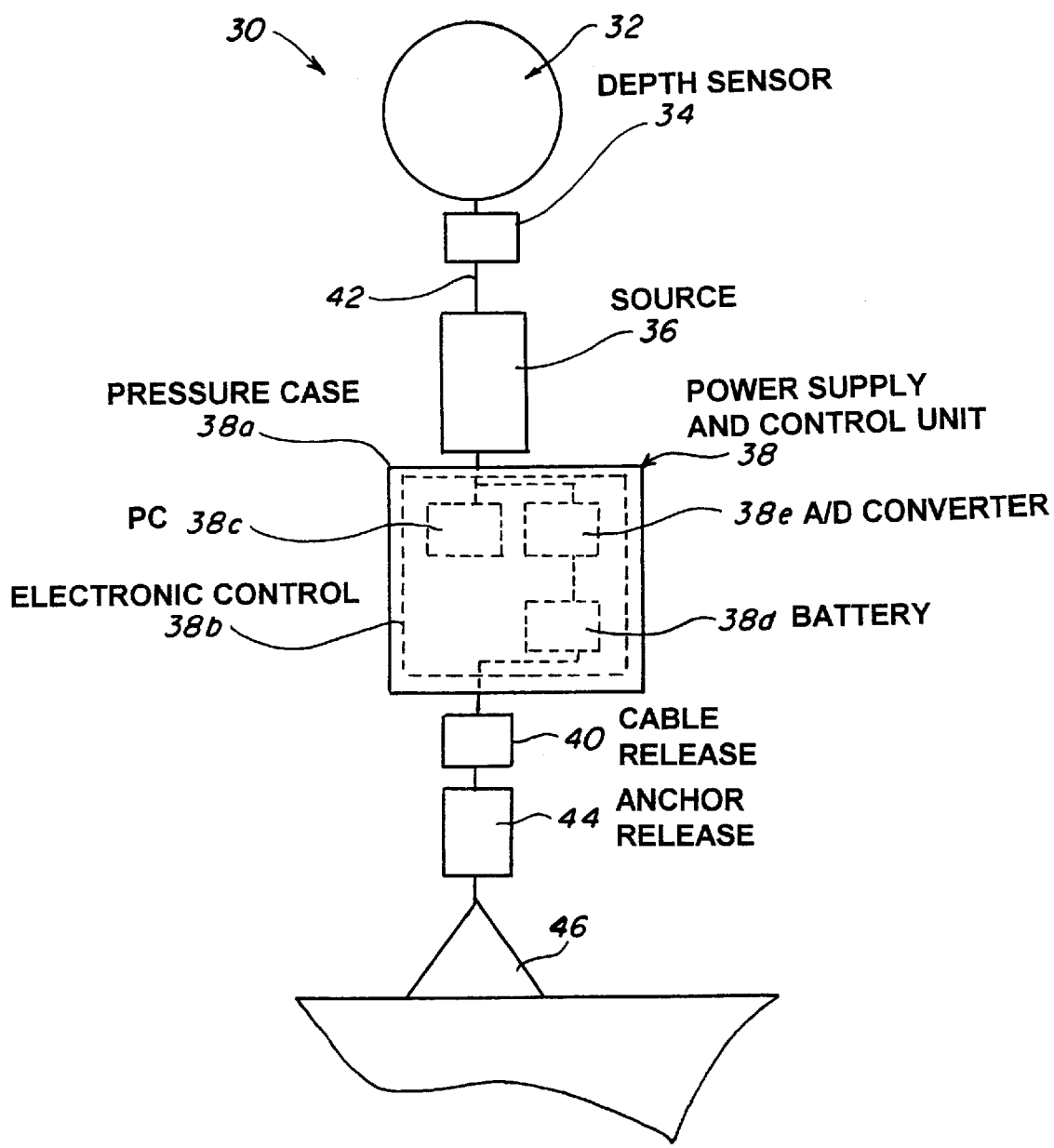
FIG. 2 is a schematic diagram of a preferred embodiment of a deployable receiver of the acoustic measurement system.

Referring to FIG. 1, there is shown a deployable hydrophone array or receiver unit in accordance with a preferred embodiment of the invention. The overall acoustic measurement system includes a plurality of these units which would be deployed at different locations in the area where the measurements are to be made, as well as at least one source unit, which is illustrated in FIG. 2 and is described below. The deployable hydrophone array or receiver unit shown in FIG. 1 is generally denoted 10 and includes the following basic units or elements: a buoyancy package 12, a connecting line or cable 14, a cable release unit 16, an anchor 18, an anchor release unit 20, a depth sensor 22, a plurality of receivers or hydrophones 24, and a pressure case 26 which houses an electronic data acquisition and control system 28. It will be appreciated that the showing in FIG. 1 is highly schematic and that the various elements are relatively small in size with respect to the cable 14 and occupy only a very small part of the length thereof.

Considering the specific elements or components of FIG. 1 in more detail, buoyancy package 12, which basically comprises a buoy or float, serves to support the acoustic array in an upright orientation. The selection of a buoyancy package 12 for the deployable unit 10 is not critical and different buoyancy packages 12 can be selected to account for differences in the weight of individual components. The buoyancy package 12 should have sufficient buoyant force to lift the cable 14 and the other components of the deployable unit 10 and to support the cable and other components in a substantially vertical position. In a preferred embodiment, the buoyancy package 12 generates sufficient buoyant force to lift a deployable receiver 10 having a mass of 200 kg to a height (depth) of about 10 m below the surface of the water when the cable 14 is fully extended.

Cable 14 connects the buoyancy package 12 and other components to the anchor release unit 20. Cable 14 has sufficient flexibility to be coiled around a drum or the like, and, in use, uncoils and deploys under the control of the timed release unit or device 16. The cable 14 uncoils so as to enable the buoyancy package 12 to rise to a predetermined depth, i.e., in FIG. 1, to a preselected height above the bottom B on which anchor 18 rests. The cable release unit 16 preferably comprises a suitable releasable cable latch or latching mechanism 16a. As indicated above cable 14 is preferably coiled on a spool or drum (not shown), and the latching mechanism 16a is released responsive to a timer 16b or is otherwise actuated when the receiver unit is deployed over the side of a ship or other craft so that the cable 14 is payed out as buoyancy package 12 rises. The cable 14 is preferably manufactured from Kevlar®, but can be made from any other suitable material.

Depth sensor 22 is also attached to the cable 14. In a preferred embodiment, the depth sensor 22 is positioned close to the receiver array 24. The depth sensor 22 is also electrically connected to the data acquisition system 28 and preferred embodiment under consideration, the data acquisition system 28 records one channel with a sampling rate of 30 kHz for a period of 24 hours. The start and end times of recordings are programmable using PC 28a.

Referring to FIG. 2, deployable source unit 30 is shown which includes a number of components or units in common with the receiver array or unit of FIG. 1. The source unit 30 includes the following basic elements or units: a buoyancy package 30, a depth sensor 34, a broadband source 36, a power supply and control unit 38, a cable release unit 40, a cable 42, an anchor release unit 44, and an anchor 46.

Considering the components of the source unit 30 in more detail, the buoyancy package 30 can be of the same type as buoyancy package 12 of FIG. 1. Likewise, depth sensor 34, cable 42, anchor release unit 44, and anchor 46 can be of the same type as the corresponding units of FIG. 1, and thus will not be described further.

The source (or source array) 36 of source unit 30 is designed to transmit acoustic signals of sufficient frequency and intensity to enable measurements to be made of fish population data. Continuous wave (CW) signals at frequencies between 0.2 and 10 kHz and an intensity of at least 160 dB (preferably 170 dB) are sufficient for this purpose. Continuous wave (CW) signals will be transmitted at frequencies starting at about 0.2 kHz and ending about 10 kHz. The durations of signal transmissions at each frequency will be nominally 100 seconds, which will result in a "processing gain" of 20 dB. The actual durations will be site specific and be determined by the source level of the source, and ambient noise and transmission loss level. An intensity of approximately 160 dB generates a signal-to-noise ratio of approximately 40 dB over the frequency range. In a possible embodiment, the virtual source 32 comprises a single Navy standard J-1 1 source. As described below, in an important implementation, the source 32 will be deployed initially below the thermocline for about 12 hours, and subsequently above the thermocline for about 12 hours.

The power supply and control unit 38 includes an electronic control circuit 38b which basically comprises an "energy pack" and control circuitry housed within, and protected by a pressure case 38a. The electronic control circuit 38b includes a computer (PC) 38c, a battery (or batteries) 38d, and an amplifier 38e. The electronic control circuit 38b provides electrical power to the source 36 and also controls the duration and frequency of the signals transmitted by the source 36. The start and stop times of these signal transmissions are programmable using PC 38b. Preferably, the battery 38d has sufficient capacity to permit continuous transmission of CW signals for 24 hours.

In the operation of the overall system, subsequent to the deployment operation described below, at least one acoustic receiver corresponding to unit 10 receives and records acoustic signals from at least one acoustic source corresponding to unit 30 in order to determine fish population data in waters of littoral environments. To maximize sensitivity of transmission loss measurements with respect to fish near the surface (above the thermocline if there is a thermocline), the acoustic sources and acoustic receivers should be placed near the surface (above the thermocline). Further, to maximize sensitivity to fish near the bottom (below the thermocline if there is a thermocline), acoustic sources and acoustic receivers should be placed near the bottom (below the thermocline). One feature of the invention is that it enables this to be achieved using the same sources and receivers.

Figure 3:
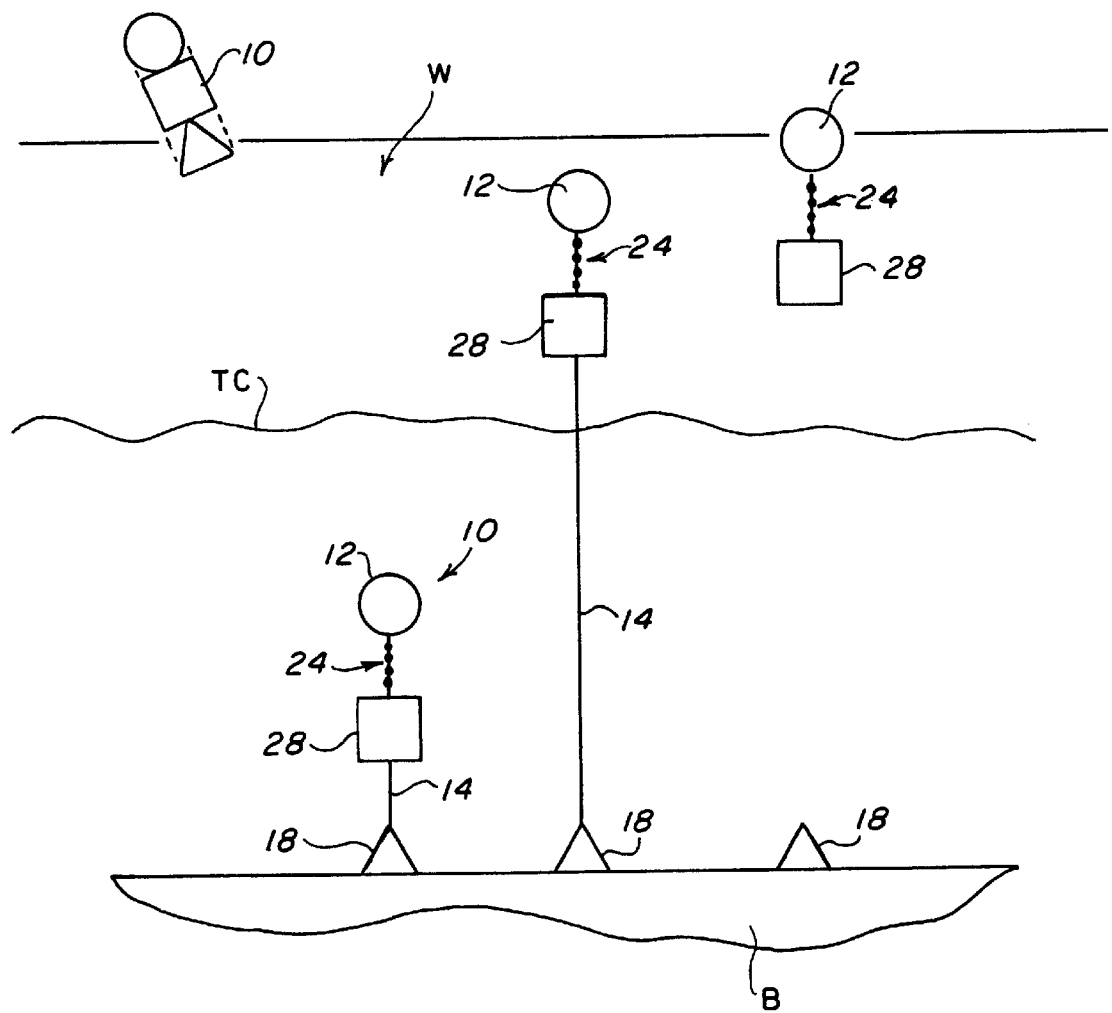
FIG. 3 is a schematic diagram of a four-step process for deploying and recovering the deployable receiver of FIG. 1 (and the deployable source of FIG. 2).

Turning to the deployment and measurement operation and referring now to FIG. 3, at least one acoustic receiver unit and at least one acoustic source unit are deployed from a ship, an aircraft, or other vehicle into the water, as indicated by the receiver unit 10 at the left of FIG. 3, which is shown entering the water W above the thermocline TC. Once so deployed, the receiver unit 10 sinks to the bottom B of the water and, as indicated by the next depiction in FIG. 3, the cable release unit 16 (not shown in FIG. 3) activates to release and uncoil the cable 14 and buoyancy package or float 12, so that the hydrophones of the receiver 24 are moved into position as float 12 rises. In this regard, the cable 14 continues uncoiling until the receiver 24 suspended from float 12 rises to a height (depth) determined by the preselected controlled amount of cable 14 that is payed out and thus the receiver 24 is positioned at a selected depth below the thermocline TC.

It will be appreciated that once deployed, the acoustic source 30 performs in the same way to position the acoustic source at a selected depth below the thermocline TC.

Next, with the source unit 30 and receiver unit 10 fully deployed and anchored to the bottom B, the acoustic source 36 of the acoustic source unit 30 transmits acoustic signals at this first depth. The receiver 24 of the acoustic receiver unit 10 receives the acoustic signals from the acoustic source unit 30 at this first depth and stores the acoustic signals. The length and duration of the signals will vary according to the selected measurement routine, but a typical continuous wave signal will last 12 hours.

Referring to the next operation depicted in FIG. 3, after the measurement process at the first depth is completed, the acoustic receiver unit 10 adjusts the height between the acoustic receiver 24 and the bottom B of the water by activating the cable release unit 16 (not shown) a second time to pay out more of cable 14 and thus allow the acoustic receiver 24 to rise to a second depth above the thermocline TC. Of course, a similar operation is carried out for source 30 so as to adjust the height (depth) between the acoustic source 30 and the bottom B such that source 30 is positioned at a similar position above the thermocline.

Similarly to the operation at the first depth, the acoustic source unit 30 next transmits acoustic signal at the second depth and the acoustic receiver 24 of the acoustic receiver unit 10 receives and stores the acoustic signal in at the second depth. Again, the length and duration of the signal will vary according to the selected measurement routine, but a typical signal will last 12 hours. The 12 hour time periods are chosen to provide a full day of operation which accommodates the different schooling patterns of fish during daylight and at night.

Turning to the last depiction in FIG. 3, at the end of the second measurement operation, the timed anchor release mechanism 20 (not shown in FIG. 3) activates and allows the buoyancy package 12 to lift the receiver unit 10 to the surface to enable retrieval. Source 30 is similarly released and lifted to the surface.

During or after periods when the data is being recorded, transmission loss is calculated. Both raw hydrophone signals and the calculated magnitudes of transmission loss are recorded. The latter can be used to display transmission loss versus time and frequency, when the recorders are recovered, precluding computations of transmission loss after recovery. Alternately, if the receiving arrays are augmented with RF transmitters, calculated magnitudes of transmission loss can be transmitted via a RIP link or satellite to a nearby ship or elsewhere.

The relatively light weight of the receiver unit 10 and source unit 30 is an important factor in reducing costs. Together with alkaline batteries and the floatation device 12, a receiver unit 10 using a Navy standard J-1 1 moving coil "calibration" source will weigh about 350 lb (excluding the anchor). Combinations of other types of sources and different batteries may be expected to weigh significantly less. A virtual hydrophone array comprising four hydrophones, and wherein energy is provided by alkaline batteries will weigh about 300 lb (excluding the anchor). It will be appreciated that such weights can be readily manipulated, and deployed and recovered from small ships that have cranes.

Considering some of the more general advantages of the invention, the invention will permit measurement of number densities as a function of fish length. The conventional method currently used, which employs echo sounders, is not sensitive to fish length. This invention is relatively non-invasive compared to existing fish finding sonars, i.e., the invention is unlikely to affect fish behavior. As indicated above, the source level required for its operation is at least approximately 160 dB (preferably 170 dB) re 1 pPa, whereas the source level of conventional fish finding echo sounders is typically 220 dB re 1 pPa (the required energy for absorption spectroscopy measurements is 106 times less than the energy emitted by a conventional echo-sounder fish finding sonar).

The invention will also permit synoptic measurements over large areas, where a plurality of widely spaced receiving arrays are employed. This is not possible with conventional echo sounding from ships. Since such surveys are typically conducted at speeds of about 6 knots over periods of several days, fish concentrations change during the course of surveys.

Further, the invention will permit measurements of the temporal evolution of the spatial concentrations of fish. This is not possible with conventional echo sounding from ships because of the non-synoptic nature of these types of measurements, and because of the prohibitive costs of such measurements.

In addition, the invention will permit "calibration" of sonar performance prediction models over a broad band of frequencies in littoral environments. There are, at present, no cost-effective methods to accomplish this task.

Although the invention has been described above in relation to preferred embodiments thereof, it will be understood by those skilled in the art that variations and modifications can be effected in these preferred embodiments without departing from the scope and spirit of the invention.

What is claimed is:

1. A method for determining data with respect to fish populations in shallow water environments, said method comprising:

deploying at least one acoustic source unit and at least one acoustic receiver unit at first depths, and using said at least one receiver unit to receive and record first acoustical transmissions from said at least one source unit at said first depths; and deploying said at least one source unit and said at least one receiver unit at second depths higher than first depths, and using said at least one receiver unit to receive and record second acoustical transmissions from said at least one source unit at said second depths.

2. A method, as claimed in claim 1, wherein each of said at least one source unit and said at least one receiver unit is anchored by an anchor to the bottom and is supported on a respective cable connected to a buoyancy unit and to the anchor, and wherein each of said at least one source unit and said at least one receiver unit is positioned at said first depths by releasing the cable so that a first predetermined length of the cable is payed out as the buoyancy unit rises.

3. A method, as claimed in claim 2, wherein said units are positioned at said second depths by releasing the cable so that a second, longer predetermined length of said cable is payed out.

4. A method, as claimed in claim 3, wherein each of said units is released from its respective anchor after receiving and recording of said first and second transmissions is completed so that said units can rise to the water surface for recovery.

5. A method, as claimed in claim 1, wherein said at least one acoustic source transmits for twelve hours at said first depths and for twelve hours at said second depths.

6. A method for obtaining acoustic data for use in determining fish population in shallow waters, said method comprising the steps of:

deploying, in a shallow water site having a bottom, an acoustic source comprising a first buoyancy unit, a first anchor, at least one acoustic transmitter, and a first cable connecting said first buoyancy unit to said first anchor and supporting said transmitter;

deploying at least one acoustic receiver comprising a second buoyancy unit, at least one hydrophone, a second anchor, and a second cable connecting said second buoyancy unit to said second anchor and supporting said at least one hydrophone;

separately releasing said first and second cables so that said first and said second buoyancy units rise in the water so that, with the source and at least one receiver anchored to the bottom by said first and second anchors, said transmitter and said at least one hydrophone are, respectively, suspended at first selected depths; and transmitting first acoustic signals from the acoustic transmitter to said at least one hydrophone for recording thereby, further releasing said first and second cables so that said first and said second buoyancy units rise higher in the water and said transmitter and said at least one hydrophone are suspended at greater heights from the bottom, and transmitting further acoustic signals from the acoustic transmitter to said at least one hydrophone for recording thereby.

7. A method, as claimed in claim 6, wherein said source and said at least one receiver are respectively released from said first and second anchors after receiving and recording and said first and further acoustic signals is completed so that the source and the at least one receiver can rise to the water surface for recovery.

8. A method, as claimed in claim 6, wherein said acoustic transmitter transmits said first acoustic signals for twelve hours and transmits said second acoustic signals for twelve hours.

9. A deployable source for use in determining the fish population in a location at which the source is deployed, said source comprising:

a buoyancy unit;

at least one acoustic transmitter for generating acoustic signals for use in measuring fish population data;

an anchor;

a deployable cable, connected at one end to said buoyancy unit and at the opposite end to said anchor, for supporting said transmitter at an intermediate point along the length of said cable such that, when said cable is deployed, said buoyancy unit rises and said transmitter is suspended by said cable between said buoyancy unit and said anchor; and an anchor release means for releasably connecting said cable to said anchor.

10. A deployable, source as claimed in claim 9, wherein said acoustic transmitter comprises continuous wave broadband transmitter.

11. A deployable source as, claimed in claim 10, wherein said broadband transmitter transmits at frequencies between 0.1 and 10 kHz.

12. A deployable source, as claimed in claim 11, wherein said transmitter transmits an acoustic signal having an intensity level of at least 160 dB (preferably 170 dB).

13. A deployable source, as claimed in claim 9, wherein said source further comprises a control unit supported on said cable for supplying power to the transmitter and for controlling the operation of the transmitter.

14. A deployable source, as claimed in claim 13, wherein said control unit includes a computer programmed to control start and stop times of transmissions by said transmitter.

15. A deployable source, as claimed in claim 9, further comprising a depth sensor mounted on said cable.

* * * * *